US006832770B1

(12) United States Patent
Wright-Ott et al.

(10) Patent No.: US 6,832,770 B1
(45) Date of Patent: Dec. 21, 2004

(54) CHILD AMBULATION AID WITH ENHANCED MANEUVERABILITY

(76) Inventors: Christine Wright-Ott, 10690 Martinwood Way, Cupertino, CA (US) 95014; Richard Escobar, 7526 Dumas Dr., Cupertino, CA (US) 95014

( * ) Notice: Subject to any disclaimer, the term of this patent is extended or adjusted under 35 U.S.C. 154(b) by 0 days.

(21) Appl. No.: 10/301,037

(22) Filed: Nov. 20, 2002

(51) Int. Cl.[7] ............................ B62M 1/00; B62B 7/00; B62D 51/04; A47D 13/04; A63C 3/04

(52) U.S. Cl. ............................ 280/87.041; 280/87.051; 280/1.5; 280/200; 280/266; 5/86.1; 135/65; 297/5; 482/68

(58) Field of Search ......................... 280/87.041, 87.05, 280/87.051, 87.021, 87.02, 1.5, 47.11, 200, 250.1, 266, 269, 290; 482/69, 66, 68, 67; 5/86.1, 89.1; 297/5, 6, 13, 44, DIG. 4, DIG. 10, 307; 135/65, 66, 67, 68, 912

(56) References Cited

U.S. PATENT DOCUMENTS 4,188,966 A * 2/1980 Palmer et al. ................ 135/67
4,211,426 A 7/1980 Motloch
4,375,840 A * 3/1983 Campbell ................... 180/6.5
4,890,853 A * 1/1990 Olson .................... 280/87.021
4,893,826 A * 1/1990 Ward et al. ............ 280/87.021
5,112,044 A * 5/1992 Dubats ........................ 482/68
5,174,590 A 12/1992 Kerley et al.
5,275,426 A * 1/1994 Tankersley ............. 280/87.051
5,390,753 A 2/1995 Parker
5,419,571 A * 5/1995 Vaughan .................. 280/250.1
5,502,851 A 4/1996 Costello
5,522,782 A 6/1996 Kurtin et al.
5,526,893 A 6/1996 Higer
5,538,268 A 7/1996 Miller
5,569,129 A 10/1996 Seif-Naraghi et al.
5,588,456 A 12/1996 Hart
5,618,055 A 4/1997 Mulholland
5,676,388 A 10/1997 Bertani
5,732,964 A 3/1998 Durham et al.
5,795,269 A 8/1998 Bawtree et al.
6,056,673 A 5/2000 Arrecis
6,343,802 B1 * 2/2002 Workman et al. ...... 280/87.041
6,440,046 B1 * 8/2002 Tholkes ...................... 482/142

OTHER PUBLICATIONS

"Arrow Walker," product literature for orthopedic walker, Triaid Inc USA and Theraply Ltd. Scotland, available on line at http://www.traid.com (2001).
"Cricket Walker," product literature for orthopedic walker, Bissel Healthcare Corporation (1996).

(List continued on next page.)

*Primary Examiner*—Christopher P. Ellis
*Assistant Examiner*—G B Klebe
(74) *Attorney, Agent, or Firm*—Townsend and Townsend and Crew LLP

(57) ABSTRACT

An ambulation aid which has a support structure for the patient that both supports the patient's weight, and is movable laterally with respect to the frame to accommodate sideways hip movement of the patient's gait. The inventors have observed that a patient's hip will shift laterally as the patient steps forward and places weight on the forward stepping leg. This causes prior art ambulation aids to jerk sideways. The present invention overcomes this by providing a support structure which can move sideways without requiring the entire frame to move sideways. In one embodiment, the support structure slides in a track behind the patient, allowing lateral movement. In another embodiment, the support structure includes a belt which either slides through rollers behind the patient, or is attached but is flexible to allow hip movement, or is attached to a slider behind the patient. In one embodiment, the support structure is spring-biased to return the support mechanism to its central position after the patient takes a step.

12 Claims, 6 Drawing Sheets

OTHER PUBLICATIONS

"Hart Walker," printout from web pages illustrating the Hart orthopedic walker, http://www.flyforanaussiekid.com/hart__walker.htm and http://members.ozemail.com.au/~bloomgi/hart/pres0000.html (2002).

"Junior Stander," product literature for children's orthopedic walker, Mulholland Positioning Systems Inc. Santa Paula, CA USA (1999).

"Miniwalk," product literature for children's orthopedic walker. Mulholland Positioning Systems Inc. Santa Paula, CA USA distributer. H. Meyland–Smith A.S. Industrivej, Taars, Denmark manufacturer (2002).

"Motilo," product literature for orthopedic walker, Janton S.A. Zone Industrielle, 37120 RICHELIEU, France, available on line at http://perso.wanadoo.fr/janton/material__medic/material__medic.html, (2003).

"Mulholland Prone Stander," product literature for children's orthopedic walker, Mulholland Positioning Systems Inc. Santa Paula, CA USA (1998).

"Omni Stander," product literature for children's orthopedic walker, Mulholland Positioning Systems Inc. Santa Paula, CA USA (1999).

"Omesa Dynamico," product literature for orthopedic walker, Menichini Luigi & C. snc, Via A. Da Sangallo 1, Foligno PG, Italy, available on line at http://www.ormesa.it/en/index2.html (2003).

"Pony," product literature for orthopedic walker/gait trainer, Snug Seat, Inc., available on line at http://www.snugseat-.com (1999).

"Rabbit," product literature for orthopedic walker, Snug Seat, Inc., available on line at http://www.snugseat.com (1999).

"SMART walker," product literature for children's orthopedic walker, Advanced Orthotic Designs Inc. Mississauga, Ont., Canada (2001).

"Spee–Dee," product literature for children's gait trainer, Otto Bock Orthopedic Industry Minneapolis, MN USA (1999).

"WalkAble," product literature for orthopedic walker, Mobility Research, Tempe, AZ USA, available on line at http://www.litegait.com (2000).

"Walkabout," product literature for children's orthopedic walker, Mulholland Positioning Systems Inc. Santa Paula, CA USA (1998).

* cited by examiner

CHILD AMBULATION AID WITH ENHANCED MANEUVERABILITY

CROSS-REFERENCES TO RELATED APPLICATIONS

NOT APPLICABLE

STATEMENT AS TO RIGHTS TO INVENTIONS MADE UNDER FEDERALLY SPONSORED RESEARCH OR DEVELOPMENT

NOT APPLICABLE

REFERENCE TO A "SEQUENCE LISTING," A TABLE, OR A COMPUTER PROGRAM LISTING APPENDIX SUBMITTED ON A COMPACT DISK

NOT APPLICABLE

BACKGROUND OF THE INVENTION

The present invention relates to ambulation aids, and in particular ambulation aids for children.

A variety of different devices have been developed to aid handicapped patients. Wheelchairs are well known to most people, with large wheels and a seat, with the patient pushing the wheels to move forward. Perhaps less well known are devices for supporting a patient in a standing position. This is important because physical therapists often desire a patient to be in a weight-bearing position for a certain amount of time each day to maintain bone density and for other reasons. Such devices typically support the patient around the waist and chest, and have much smaller wheels, or casters. They have a platform for the feet, rather than a seat for the patient to sit on. Some, however, have a bicycle-type seat to allow the patient to periodically rest and take some of the weight off the patient's feet.

Another type of device is an ambulation aid, which does not have a support for the user's feet, since the user will walk with the ambulation aid. One example is shown in U.S. Pat. No. 4,211,426. These aids typically support a patient while standing or walking, yet allow sitting with a seat, similar to the standing aids described above. They allow forward movement, while supporting the patient at the hips and chest. Typically, they have casters or small wheels, unlike wheelchairs.

It is desirable for such ambulation aids to be fairly open in front, allowing the patient to get close to tables or people and to interact with them using the patient's arms and hands, without having part of the support structure in front interfering with such interaction.

The inventors have noticed in their work with different ambulation aids that they are often bulky and difficult to maneuver in narrow hallways and other confined areas. In addition, the devices tend to jerk sideways as the user attempts to move forward. Accordingly, there is a need for an improved design of an ambulation aid which is more maneuverable.

Self-directed mobility has the potential to augment early development by expanding a child's world to distances beyond arm's reach and providing a myriad of new opportunities for manipulating objects and interacting with people in the environment. Children who have a significant mobility impairment which prevents them from achieving independent mobility are thus at a great disadvantage relative to their able-bodied peers. Although young children with cerebral palsy may be able to achieve upright mobility by using assisted mobility devices such as push walkers and supported walkers, these mobility aids have not been designed to meet their needs. In particular, walkers on the market today are difficult to maneuver in the indoor environment of home and school where young children spend the majority of their day. Walker maneuverability is limited by a number of factors, such as large turning radius, casters that do not move over a variety of surfaces, and hardware placed between the feet which reduces the ability to position the legs for maneuvering the walker. The child's manipulation of objects in the environment is severely limited or precluded by the hardware on the walker that is placed in front of the child which makes it difficult or impossible for the child get close enough to objects to touch them.

BRIEF SUMMARY OF THE INVENTION

The present invention provides an ambulation aid which has a support structure for the patient that both supports the patient's weight, and is movable laterally with respect to the frame to accommodate sideways hip movement of the patient's gait. The inventors have observed that a patient's hip and trunk will shift laterally as the patient steps forward and places weight on the forward stepping leg. This causes prior art ambulation aids to jerk sideways. The present invention overcomes this by providing a support structure which can move sideways without requiring the entire frame to move sideways. In one embodiment, the support structure slides in a track behind the patient, allowing lateral movement. In another embodiment, the support structure includes a belt which either slides through rollers behind the patient, or is attached but is flexible to allow hip movement, or is attached to a slider behind the patient. In one embodiment, the support structure is spring-biased to return the support mechanism to its central position after the patient takes a step.

In another aspect of the present invention, a swiveling seat is provided. This allows the forward-projecting part of a bicycle-type seat to move sideways and get out of the way of the user's leg when moving forward. The seat has an unusually wide back surface for supporting the weight of the patient, and also for acting as a moment-arm to cause the swiveling of the seat as it presses up against the non-moving hip of the patient during walking.

In one embodiment, the present invention also includes a removable foot support to allow the device to act as both an ambulation aid and a standing aid. Additionally, the support structure is constructed so that the majority is behind the patient, to allow an open front and easy access by the patient to tables and other people in front of the patient.

In one embodiment, the ambulation aid includes a either a small wheel or a large, wheelchair-type wheel on either side, with the axle of the wheel being within four inches of the body weight vector of the patient. This makes the turning radius of the device closer to the axis of the patient's body, making it more maneuverable. In addition, the larger wheel can be gripped by the user to aid in moving forward or to hold one wheel during turning to aid in pivoting. Additionally, a large wheel moves over carpet and other irregular surfaces better than casters or small wheels. Also, a long-arm brake is provided, allowing the user to easily stop one wheel during a turn with the brake.

For further understanding of the nature and advantages of the invention, reference should be made to the following description taken in conjunction with the accompanying drawings.

DETAILED DESCRIPTION OF THE INVENTION

Figure 1:
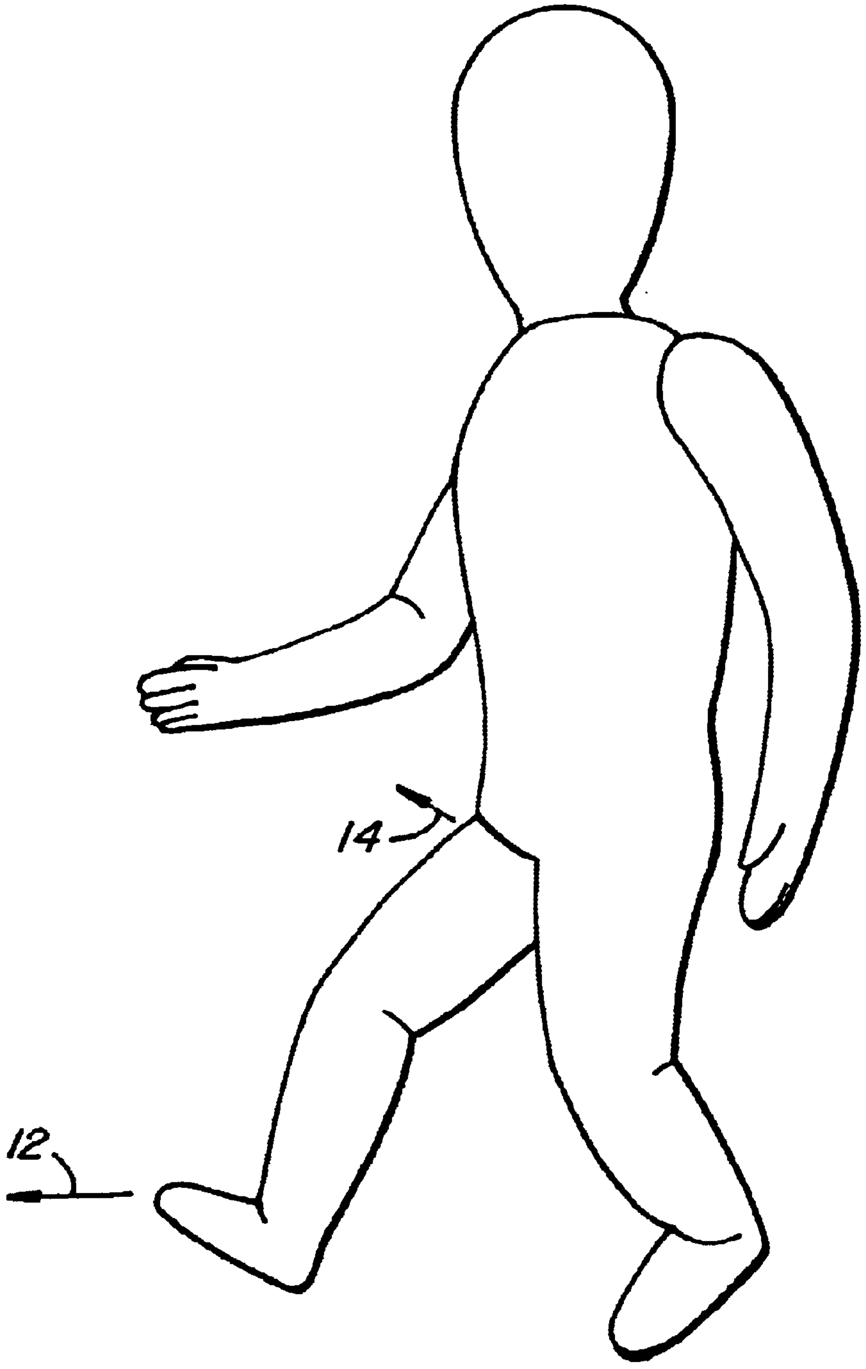
FIG. 1 is a diagram of a patient illustrating a walking gait with hip movement during a step forward.

FIG. 1 is a diagram of a patient 10 taking a step forward with the patient's right foot as illustrated by arrow 12. As the patient puts weight on the right foot, the patient's right hip will shift to the right as illustrated by arrow 14. It is this characteristic of the patient's gait that the inventors noticed causes prior art ambulation aids to jerk to the side as the patient attempts to move forward. This is due to the rigid support of the patient around the waist and chest, as required for an ambulation aid.

Figure 2:
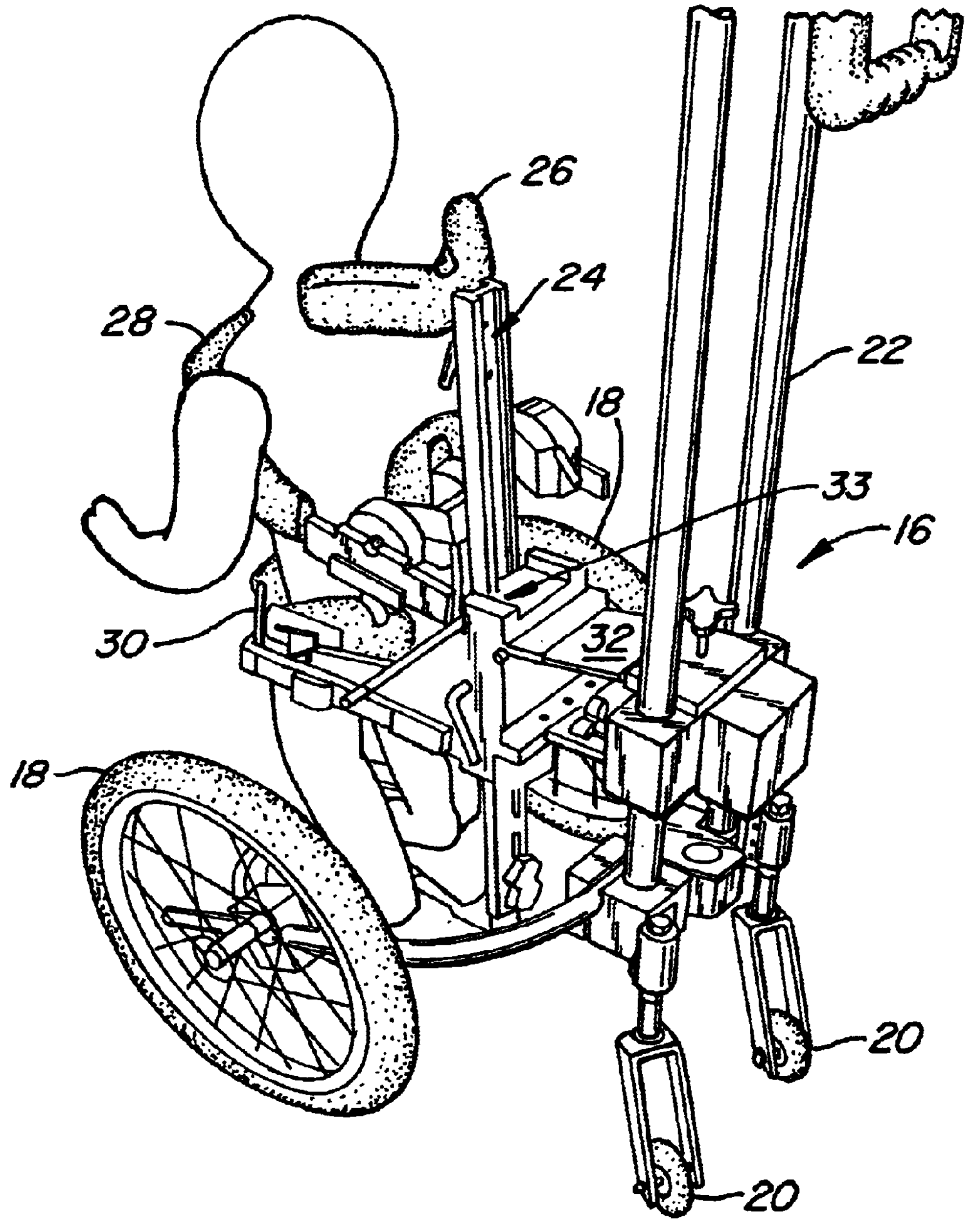
FIG. 2 is a perspective view of one embodiment of an ambulation aid according to the invention.

FIG. 2 is a diagram of one embodiment of an ambulation aid according to the present invention. A frame 16 is supported by large front wheels 18 and smaller back wheels 20 in the particular embodiment shown, two poles 22 allow a support structure 24 to be adjusted higher or lower. Support structure 24 supports the patient with a headrest 26, chest supports 28, and hip support 30.

In the embodiment shown, the head, chest and hip supports are connected to poles 22 by a flexible beam 32, which allows some up and down movement of the patient to accommodate such movement during walking. Alternately, a sliding or other mechanism could be used. Support structure 24 is connected to beam 32 with a sliding mechanism 33, which allows the patient to shift laterally during ambulation without moving the entire frame. The hip support 30 includes a pair of side arms which are connected behind the patient on a sliding ratchet mechanism which allows incremental placement of the anterior hip pad supports against the patient's pelvis.

Wheels 18 are mounted with an axle that is at or within four inches in front or behind, or preferably at or within two or three inches in front of or four inches behind the body weight vector of the patient (the head of the patient femur). As can be seen, the design, with the placement of the large wheel in the frame behind the patient, provides stability and support, while allowing tight turns to be made by the patient as well as allowing access by the patient to objects in front of the patient.

Figure 3:
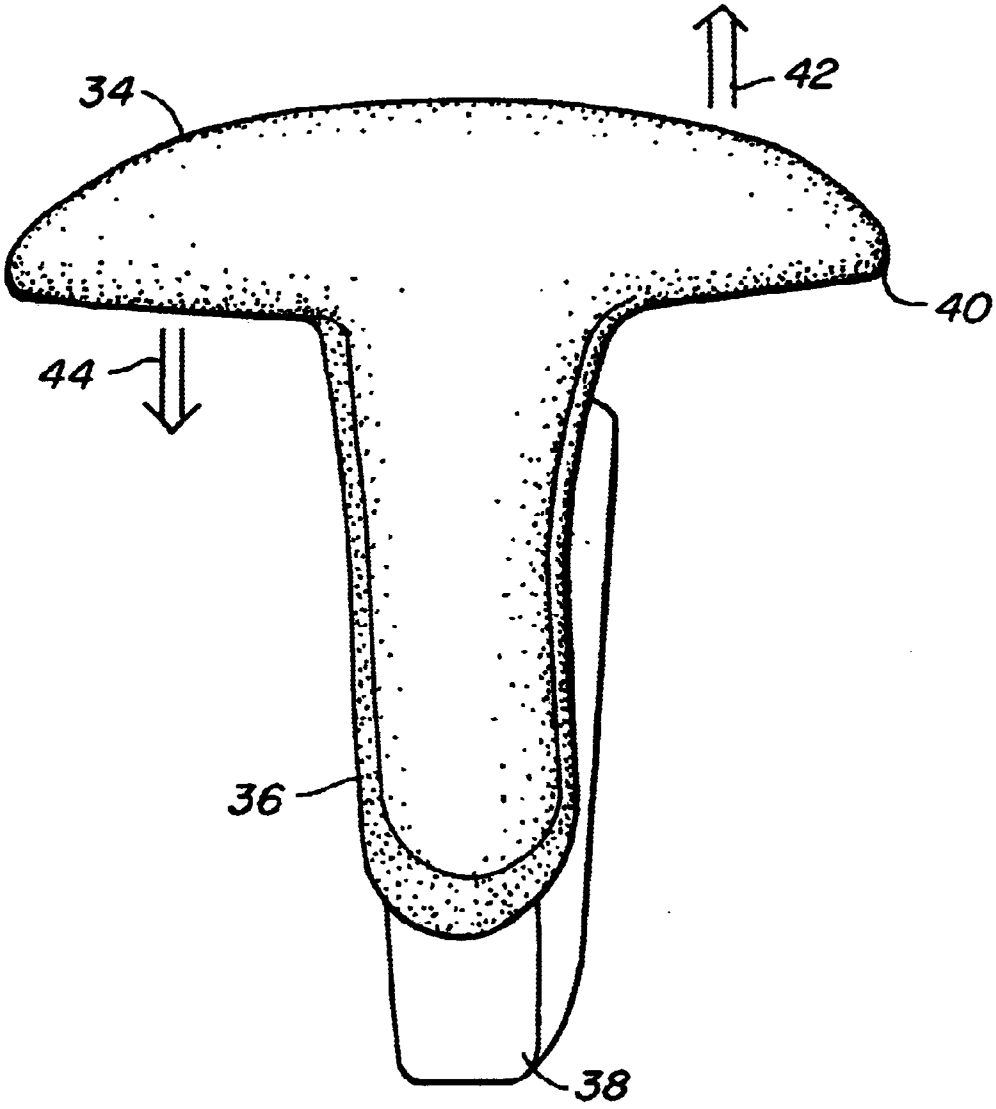
FIG. 3 is a drawing of a swiveling seat according to an embodiment of the invention.

FIG. 3 illustrates a seat 34 not clearly visible in the view of FIG. 2. Seat 34 has a forward protruding, thin portion 36, similar to a bicycle seat. Like a bicycle, this is designed to support the patient while allowing leg movement. The front portion 38 of the seat extends downward a significant amount to prevent the patient from scissoring or crossing legs during walking. The back portion 40 of the seat is wide to provide a dispersed weight-bearing surface, with the length of it acting as a steering mechanism. As the patient steps forward with the right leg, pulling the frame forward, the patient's left hip will press back against the left side of the seat, providing a backward force as illustrated by arrow 42. The seat is swivel mounted, so this will cause it to pivot about a center axis, pushing forward the right portion of the seat as illustrated by arrow 44. This will aid the patient in walking forward, giving a slight boost to the back of the right leg.

The seat operates similarly, in the opposite manner, when the left leg moves forward. The pivoting movement causes the front, thin portion of the seat to turn away from the leg that is moving forward, getting out of the way of the leg so that it won't inhibit walking. Although the patient isn't sitting on the seat while walking, it is positioned where the patient can rest on it without moving backward much, thus necessitating a position where it could interfere if it did not swivel. In addition to walking, a child can rest between steps on the T-shaped seat described above. The seat provides support under the child's ischial tuberosities.

Figure 4:
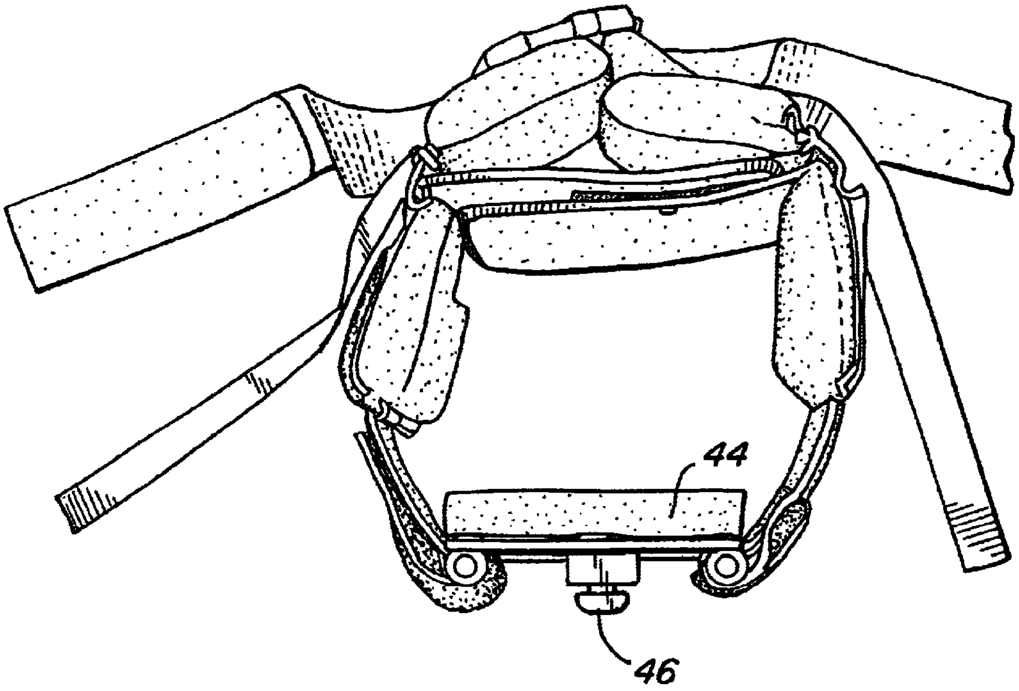
FIG. 4 is a drawing of a hip belt used in embodiment of the invention.

FIG. 4 illustrates a belt and pads used in one embodiment of the invention, as opposed to the rigid arms of hip supports 30 of FIG. 2 and associated sliding mechanism. As shown in FIG. 4, the belts attach to a plate 44 which is mounted behind the patient with a block 46. Block 46 can be rigidly mounted, relying on the flexibility of the belt to allow lateral movement. Alternately, block 46 could be mounted in a slide, allowing it to slide with lateral movement. Block 48 or the arms of FIG. 2 can be spring-based to return them to the center position after the patient takes a step or stops walking.

Figure 5:
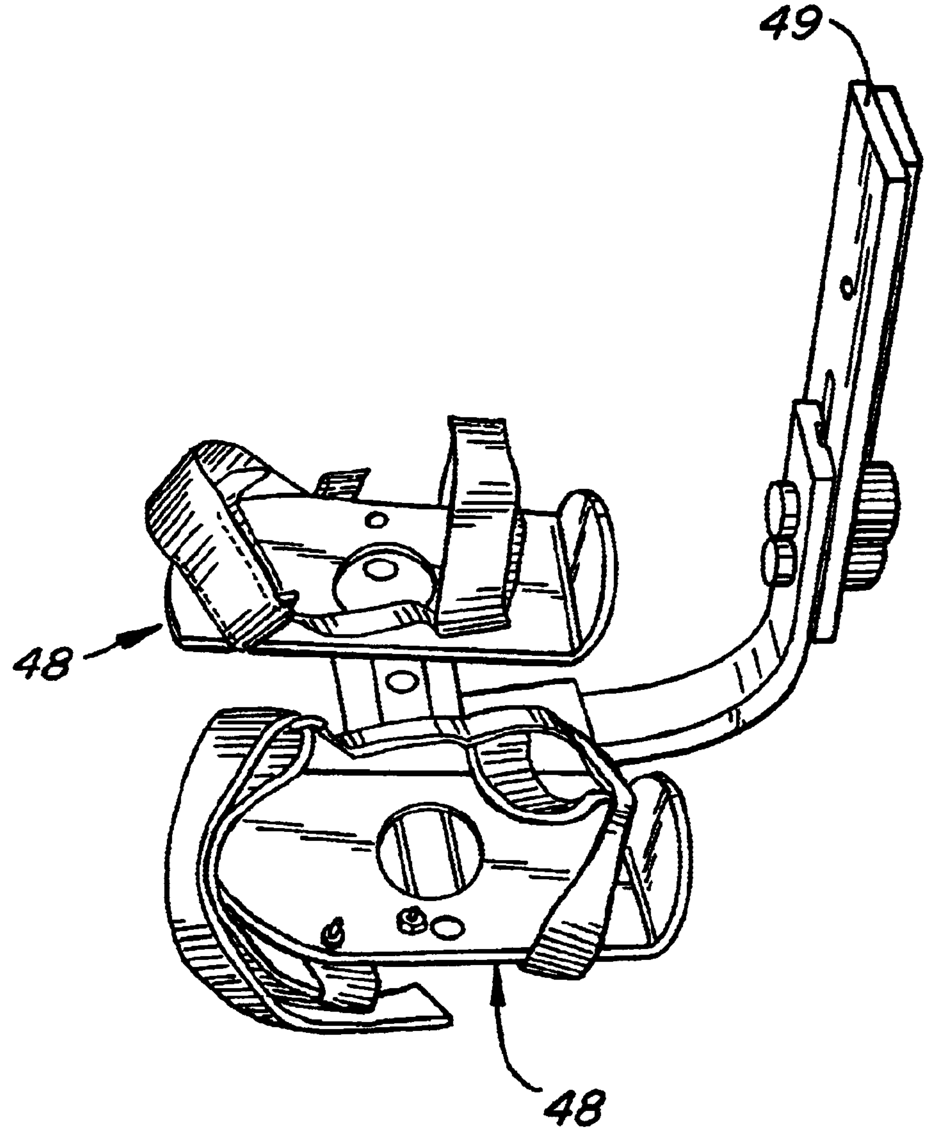
FIG. 5 is a drawing of a detachable foot support according to an embodiment of the invention.

FIG. 5 illustrates a removable foot plate according to one embodiment of the invention. The foot plate includes two foot rests 48 and a support plate 49 which can be easily attached to the frame of FIG. 2. Thus, instead of the user requiring two different devices, one for standing and one for ambulation, the same device can be converted by attaching or removing the foot support of FIG. 5. Typically, the device would be used as one or the other by a patient at most times, since most patients require one or the other. However, an individual patient could convert their own device between the two and use both fairly easily.

Figure 6:
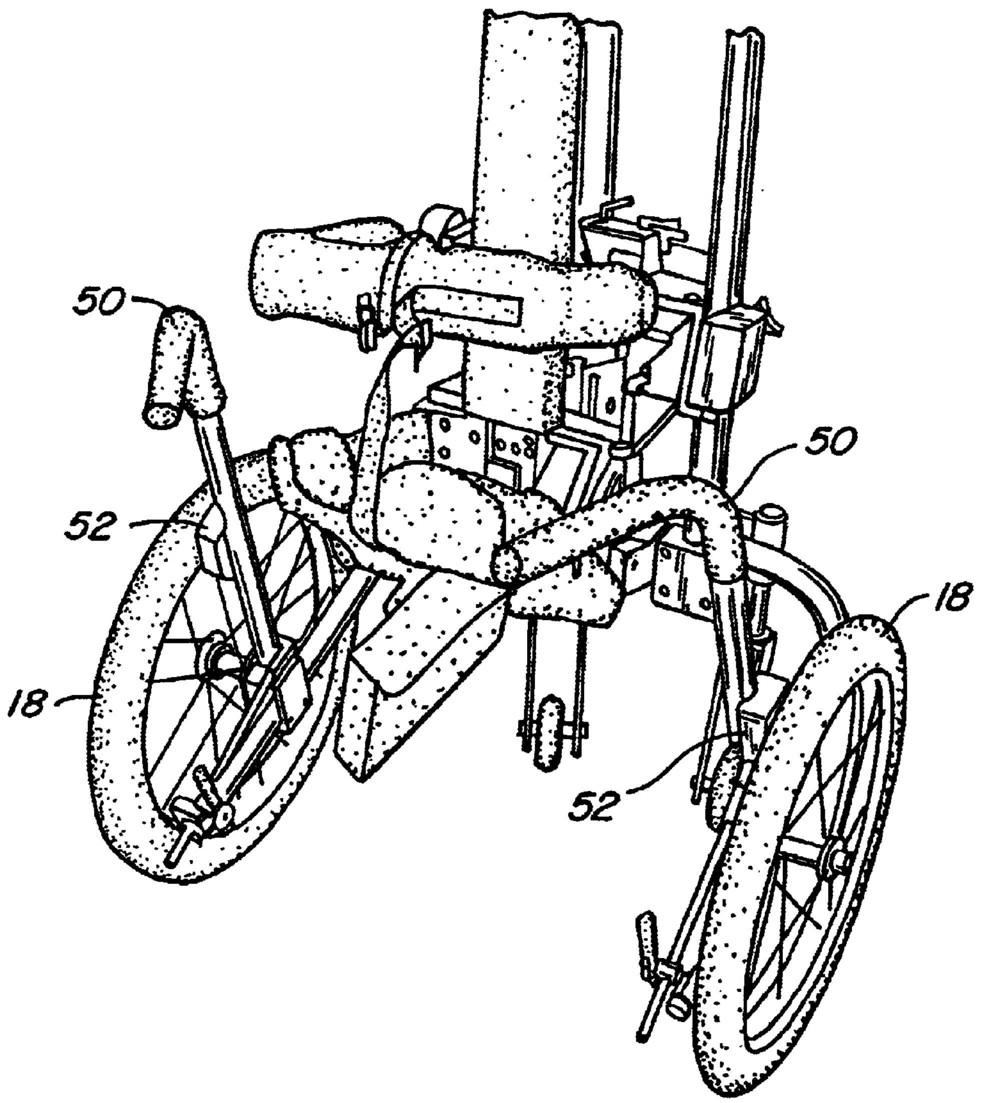
FIG. 6 is a drawing of an embodiment of a walking aid with turning handles.

FIG. 6 shows and embodiment of the ambulation aid with turning handles 50. These long turning handles are added to allow bracing against one wheel by patients with limited use of their arms. This handle allows a child to operate it with lateral arm movement, such as to hold one wheel to facilitate turning. The handle 50 pushes a pad 52 against wheel 18 to apply friction to the wheel while the user turns the other wheel. This will slow down one wheel so the user can turn in that direction as he/she propels using his/her legs. This is intended for users who do not have the ability to grab the wheel to maneuver it.

As will be understood by those with skill in the art, the present invention may be embodied in specific forms without departing from the essential characteristics thereof. For example, other mechanisms for allowing lateral hip movement and supporting the patient can be provided, and the ambulation aid can have different combinations of the other features described herein. Accordingly, the foregoing description is intended to be illustrative, but not limiting, of the scope of the invention which is set forth in the following claims.

What is claimed is:

1. An ambulator for aiding walking by a person, comprising:

a wheel supported frame;

a rigid support structure, mounted on said frame behind a position for said person;

a patient support, coupled to said rigid support structure, for supporting a person's body weight;

an attachment mechanism, for attaching said patient support to said rigid support structure, said attachment mechanism allowing lateral translational displacement of said patient support at a point of attachment to said attachment mechanism to accommodate sideways hip and trunk movement of the person's gait.

2. The ambulator of claim 1 wherein said support structure includes hip pads mounted on a sliding hip pad holder.

3. The ambulator of claim 1 wherein said support structure includes a belt attached to said frame to allow sideways hip movement.

4. The ambulator of claim 1 wherein said support structure includes a swiveling T-shaped seat.

5. The ambulator of claim 4 wherein said swiveling seat has a sideways, weight-supporting portion sufficiently wide to allow backward force to be applied by the hip of the person that is not moving forward, thereby causing swiveling of the seat.

6. The ambulator of claim 1 further comprising two wheels supporting said frame, said wheels being greater than four inches in diameter.

7. The ambulator of claim 6 wherein said wheels are of sufficient diameter to allow them to be grasped by the hands of the person.

8. The ambulator of claim 6 wherein said wheels are mounted within three inches forward or four inches behind of the body weight vector of the person.

9. The ambulator of claim 1 further comprising:

a removable foot plate coupled to a bottom portion of said frame.

10. The ambulator of claim 6 further comprising:

an elongate turning handle having an end biased against one of said wheels and having sufficient length to allow the person to operate the handle with lateral arm movement.

11. The ambulator of claim 1 further comprising:

a biasing mechanism for biasing said support structure to a central position.

12. An ambulator for aiding walking by a person, comprising:

a wheel supported frame;

a rigid support structure, mounted on said frame behind a position for said person;

a patient support, coupled to said rigid support structure, for supporting a person's body weight;

an attachment mechanism, for attaching said patient support to said rigid support structure, said attachment mechanism allowing lateral translational displacement of said patient support at a point of attachment to said attachment mechanism, to accommodate sideways hip and trunk movement of the person's gait without changing a direction of said ambulator;

two wheels supporting said frame, said frame, said wheels being greater than four inches in diameter, said wheels being mounted within three inches in front and four inches behind the body weight vector of the person; and a sideways swiveling T-shaped seat, configured to swivel sideways in response to said sideways hip and trunk movement of said person's gait;

wherein the majority of said frame and support structure is behind and to the sides of said person.

* * * * *